US005372219A

United States Patent [19]

Peralta

[11] Patent Number: 5,372,219

[45] Date of Patent: Dec. 13, 1994

[54] METHOD AND APPARATUS FOR PERFORMING FLUID CHANGES IN AN INTERNAL COMBUSTION ENGINE

[75] Inventor: Eduardo Peralta, Freeport, N.Y.

[73] Assignee: David V. Habif, Jr., Tenafly, N.J.

[21] Appl. No.: 90,707

[22] Filed: Jul. 13, 1993

[51] Int. Cl.[5] .......................... F16C 3/14; F16N 33/00

[52] U.S. Cl. .................................. 184/1.5; 184/105.1; 123/196 S

[58] Field of Search ............................. 184/1.5, 105.1; 123/196 S

[56] References Cited

U.S. PATENT DOCUMENTS 2,158,914 5/1939 Rinehart .............................. 184/1.5
3,282,380 11/1966 Burrell et al. ........................ 184/1.5
4,095,673 6/1978 Takeuchi .
4,240,523 12/1980 Nestor et al. ........................ 184/1.5
4,674,456 6/1987 Merritt .
4,869,346 9/1989 Nelson .
4,884,660 12/1989 Bedi .
4,909,205 3/1990 Bewley, III .......................... 184/1.5
4,938,315 7/1990 Ohata et al. .
5,044,334 9/1981 Bedi .
5,056,621 10/1991 Trevino .
5,062,500 11/1991 Miller et al. .
5,074,380 12/1991 Bedi et al. .
5,090,376 2/1992 Bedi .
5,092,429 3/1992 Linares et al. .
5,148,785 9/1992 Sendak .
5,154,775 10/1992 Bedi .
5,168,844 12/1992 Waelput .

FOREIGN PATENT DOCUMENTS 0525802 5/1955 Italy ................................ 123/191.5
0016115 1/1988 Japan .................................. 184/1.5
0057808 3/1988 Japan .................................. 184/1.5
1386722 4/1988 U.S.S.R. .............................. 184/1.5

*Primary Examiner*—Thomas E. Denion
*Attorney, Agent, or Firm*—Ratner & Prestia

[57] ABSTRACT

An internally-mounted apparatus for high speed oil changes, pre-lubrication and engine cleansing/flushing is disclosed. The apparatus is specially designed to be easily configured as necessary to perform the above-mentioned operations. The apparatus includes a valve and a reversible pump coupled between the oil drain opening and a multi-way valve. The multi-way valve can be configured such that 1) old oil can be pump out of the engine and into an external storage container, 2) out of an internally-mounted new oil container and into the engine, and 3) from the oil drain opening to an oil fill opening for purposes of circulation. The pump and the valves can be electronically-controlled for operator convenience.

9 Claims, 7 Drawing Sheets

METHOD AND APPARATUS FOR PERFORMING FLUID CHANGES IN AN INTERNAL COMBUSTION ENGINE

FIELD OF THE INVENTION

The invention generally relates to a method and apparatus for changing motor oil, and, optionally, cleansing and flushing an internal combustion engine. More particularly, the invention relates to an internally-mounted apparatus which, depending on its mode of operation, performs 1) pre-lubrication, 2) an oil change and 3) a cleansing and flushing of residual old oil and other contaminants which adhere to the internal surfaces of the engine.

BACKGROUND OF THE INVENTION

The benefits of routine oil changes to internal combustion engines are well known. Routine oil changes have been shown to increase engine life and performance. With repeated prolonged use, motor oil builds up metallic and non-metallic suspended particles from the abrasive and/or adhesive wear of engine parts against one another and from products of incomplete combustion and improper air intake. This adversely effects engine performance and, if left unchanged, can destroy or cripple the engine performance.

To obtain satisfactory automotive engine performance, changing the motor oil in an automobile engine is a necessary, but an undesirable, dirty, and time-consuming task. In currently designed vehicles, the oil pan serves the purpose of a reservoir for circulation of engine oil. Engine lubrication is generally accomplished through a Bear-type pump. The pump picks up engine oil from the oil pan sump, where oil is drawn up through the pick-up screen and tube, and past through the pump to the oil filter. Oil is routed from the filter to the main oil gallery and, from there, throughout the engine. In the filter, the oil passes through a filtering element where dirt and foreign particles are removed.

To remove contaminated oil, the drain plug, generally located in the lowermost region of the oil pan, is opened. The degraded (spent) oil containing suspended particles is permitted to flow under gravity out of the pan into a suitable receptacle. After the spent oil is removed, the used oil filter can be removed and replaced. The drain plug can, then, be replaced and fresh oil added to the engine; usually through a separate oil fill opening, such as in the engine valve cover.

The process of gravity drainage does not remove all of the spent oil with its metallic and non-metallic particulates because gravity drainage provides only minimum scrub cleaning or scouring action and cannot dislodge strongly adhering particulates and degraded oil components. A significant portion sticks to the oil pan walls, as well as to the surfaces and passages of engine components such as the crank shaft, connecting rods, pistons engine block, cylinder head and the like. These particles remain to be mixed with fresh motor oil. Thus the concentration of contaminants is lowered by dilution and only a part of the total contaminants are eliminated.

The oil change process is essentially the same whether performed at home, at service stations or at one of the various rapid oil change centers which have opened in recent years. Spent or dirty oil is allowed to collect in the oil pan and is, then, permitted to drain from the oil pan through the drain plug opening located in the lowermost portion of the oil pan. The drain plug opening is, then, closed and fresh oil is added to the crankcase and oil pan through a suitable opening such as the valve cover.

The commercially available oil change process is also limited by the time required for oil drainage. The flow rate, or time required for oil drainage, is the same for each of these locations, because it is limited by the size of the drain plug aperture and the force of gravity. Service stations and other locations simplify the process of oil drainage with the use of hydraulic racks, special oil collection receptacles and the like. However, this specialized and expensive equipment is not readily available to the typical automotive owner who may wish to change the oil in his vehicle at home.

The do-it-yourself individual typically believes that if you want a job done right, you do it yourself. However, the current design of vehicles does not lend itself to do-it-yourself oil changes in a convenient clean and effortless manner. Many vehicles have low ground clearance making it difficult to access the oil drain plug for removal of the spent oil, and also making it difficult to collect the oil without contaminating the surrounding environment.

Thus, it would be desirable to provide an apparatus which accelerates removal of spent oil from the oil pan and the filter more completely and easily from the crank case. It would also be desirable to provide a system which reduces the amount of spent oil handling as required in the conventional oil change service station. Finally, it is desirable to provide a method which could be easily employed by all the vehicle owners whether at home or at a convenient service station with the benefits of time and money savings, convenience, and longer lasting, better performing engines.

SUMMARY OF THE INVENTION

The present invention involves an internally-mounted high speed fluid change apparatus and method for an internal combustion engine. The apparatus is for use with an internal combustion engine having an oil pan with a drain opening and an oil fill opening. It includes a first fluid line coupled, at one end, to the drain opening and, at its other end, to a first valve. The first valve is coupled to a reversible pump. Connected to the reversible pump is a second fluid line. Also included are a new fluid container for holding new fluid and a third fluid line which is coupled to the new fluid container. A second valve, for selecting a flow path for fluid being pumped, is coupled at a junction of the second and third fluid lines and is also adapted to dispose of fluid being pumped through it.

BRIEF DESCRIPTION OF THE DRAWINGS

The invention is best understood from the following detailed description when read in connection with the accompanying drawings, in which.

DETAILED DESCRIPTION OF THE INVENTION

Figure 1:
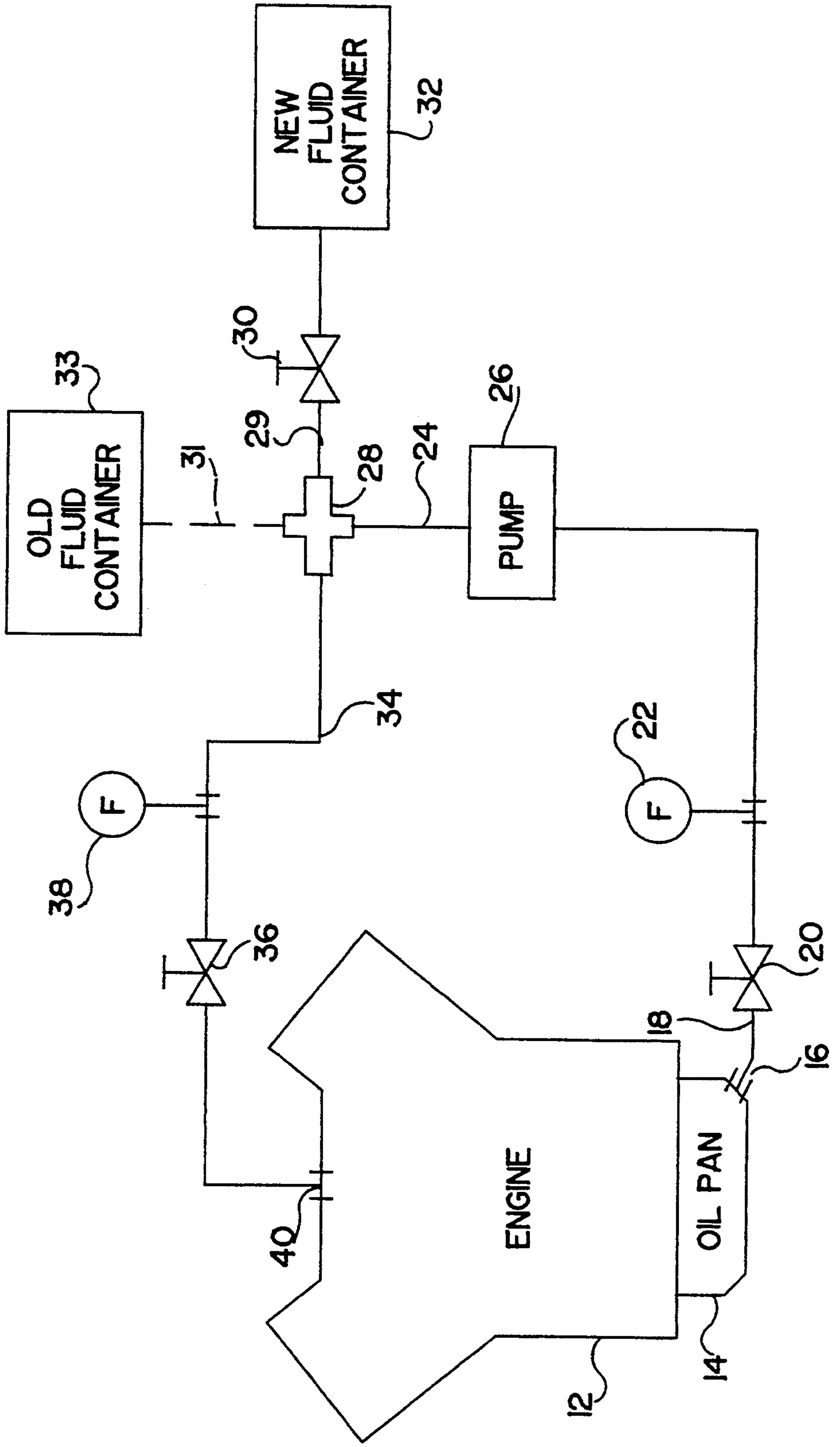
FIG. 1 shows an exemplary embodiment of the present invention.

FIG. 1 shows a functional diagram of an exemplary embodiment of the present invention. FIG. 1 shows an internal combustion engine 12 with an oil pan 14. Oil pan 14 has an oil drain opening 16 which, in conventional setups, is plugged with an oil drain plug (not shown).

The exemplary embodiment of the present invention includes a first oil conveying conduit line 18 which is coupled to oil drain opening 16. At its other end, oil line 18 is coupled to a reversible pump 26. Coupled in the path of oil line 18 is a valve 20 having an open and closed state and a flow meter 22 for monitoring oil flow through oil line 18.

Pump 26 is coupled to four-way valve 28 via a second oil conveying conduit line 24. Four-way valve 28, depending on the operational mode of the oil change apparatus, is used to select the path of oil flow. The selection choices are set forth below as further details of the exemplary embodiment and its operation are described. It should be noted that it is contemplated that, if the present invention were only being used for oil change purposes, four-way valve 28 would only have to be a three-way valve.

Four-way valve 28 is coupled, by way of a third oil conveying conduit line 29, to a new oil reservoir 32. New oil reservoir 32 holds oil or a cleansing solution until it is pumped into the engine. Coupled in the path of oil line 29 is a valve 30. Valve 30 is optional and can be used for isolating different sections of the present invention for safety and repair purposes.

Four-way valve 28 is adapted with a quick action coupling device so that when it is desirable to remove a a fluid such as oil from the engine, an old fluid container 33 can be coupled to four-way valve 28 via line 31 in order to receive the fluid.

Four-way valve 28 is also coupled to the oil fill opening 40 of engine 12 by a fourth oil conveying conduit line 34. In the path of oil line 34 is a valve 36 having an open and closed state and a flow meter 38 for monitoring fluid flow in oil line 34. Valve 36 is optional and can be used for isolating different sections of the present invention for safety and repair purposes.

Figure 7:
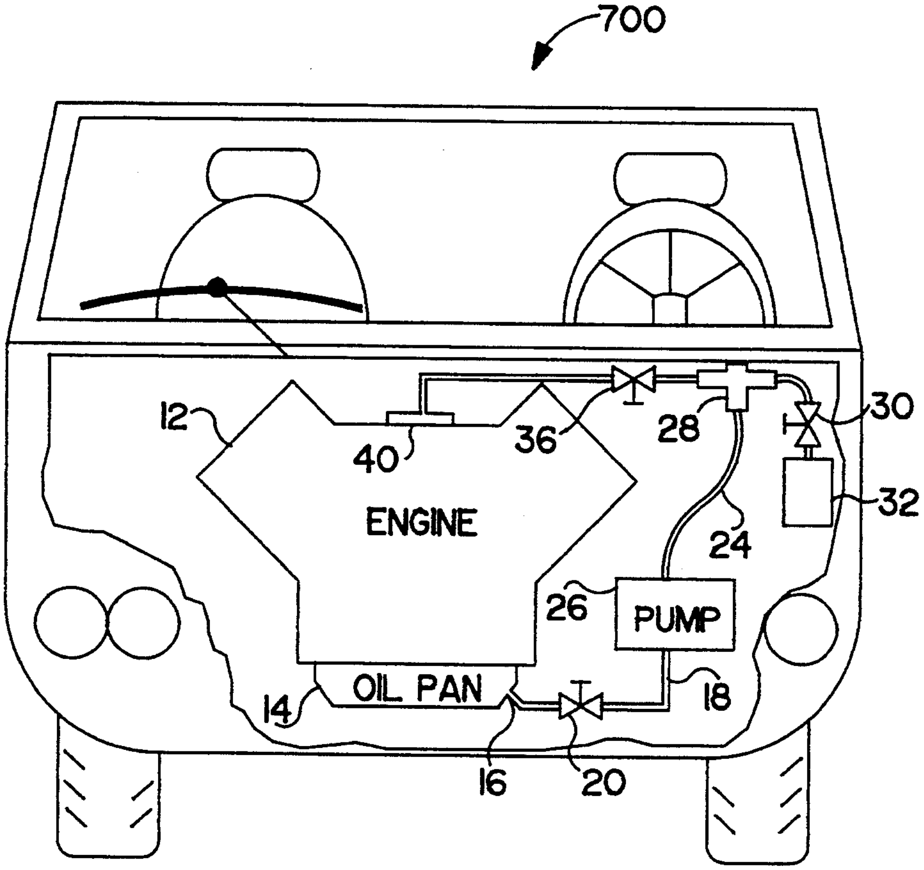
FIG. 7 shows the embodiment of FIG. 1 incorporated into a land vehicle.

It should be noted that in some internal combustion engines there are more than one oil fill opening. In this case, an exemplary embodiment could be desined such that oil line 34 branches out to connect to each of the oil fill openings providing the most efficient fluid flow/spray for pre-ignition lubrication and cleansing/flushing operations. FIG. 7 shows the embodiment of FIG. 1 incorporated into a land vehicle (e.g., car).

It should also be noted that the above-described apparatus, with the exception of fluid line 31 and old fluid container 33, for the convenience of the car owner (or service station attendant), is mounted internally and, preferably, under the hood.

In operation, the present invention is specially designed such that it can be configured in several different ways by appropriately controlling the valves and pump 26. These different configurations are then used to perform certain desirable operations such as an oil change, pre-ignition lubrication and engine cleansing/flushing.

A first configuration places the present invention in a passive or idle state in which the internal combustion engine 12 operates as usual without interruption from the present invention. In this configuration, valve 20 is closed, pump 26 is off, valve 28 is closed, and, if used, valves 30 and 36 are closed.

A second configuration is used, for example, during the first step in changing the engine oil. In the second configuration, as described in detail below with reference to FIG. 2, the old oil is pumped out from engine 12 via oil drain opening 16 and placed in old fluid container 33.

A third configuration is used, for example, during the second step in changing the engine oil. In the third configuration, as described in detail below with reference to FIG. 3, new oil is pumped into engine 12, via oil drain opening 16, from new fluid container 32.

And, as described in detail below with reference to FIG. 4, a fourth configuration is used to allow fluid which exists in engine 12 and oil pan 14 to be circulated throughout engine 12, for example, during a pre-ignition lubrication or a cleansing/flushing operation.

As mentioned, an oil change is a two step operation which employs the first configuration during step 1 and then the second configuration during step 2. Other operations such as pre-lubrication and cleansing may employ a single configuration or a combination of the above-described configurations during the performance of the respective operations.

For example, a pre-lubrication operation employs the fourth configuration for a predetermined period of time (typically 30 seconds). In this way, oil is provided from oil pan 14 to engine components by way of oil fill opening 40.

A more complicated example is the cleansing/flushing operation. This includes the sequential combination of 1) a second configuration for removing old oil, 2) a third configuration for pumping a cleansing solution into engine 12, 3) a fourth configuration for circulating the cleansing solution throughout engine 12, 4) another second configuration for removing the cleansing solution from engine 12, and 5) another third configuration for pumping new oil into engine 12.

FLUID OUT OPERATION

Figure 2:
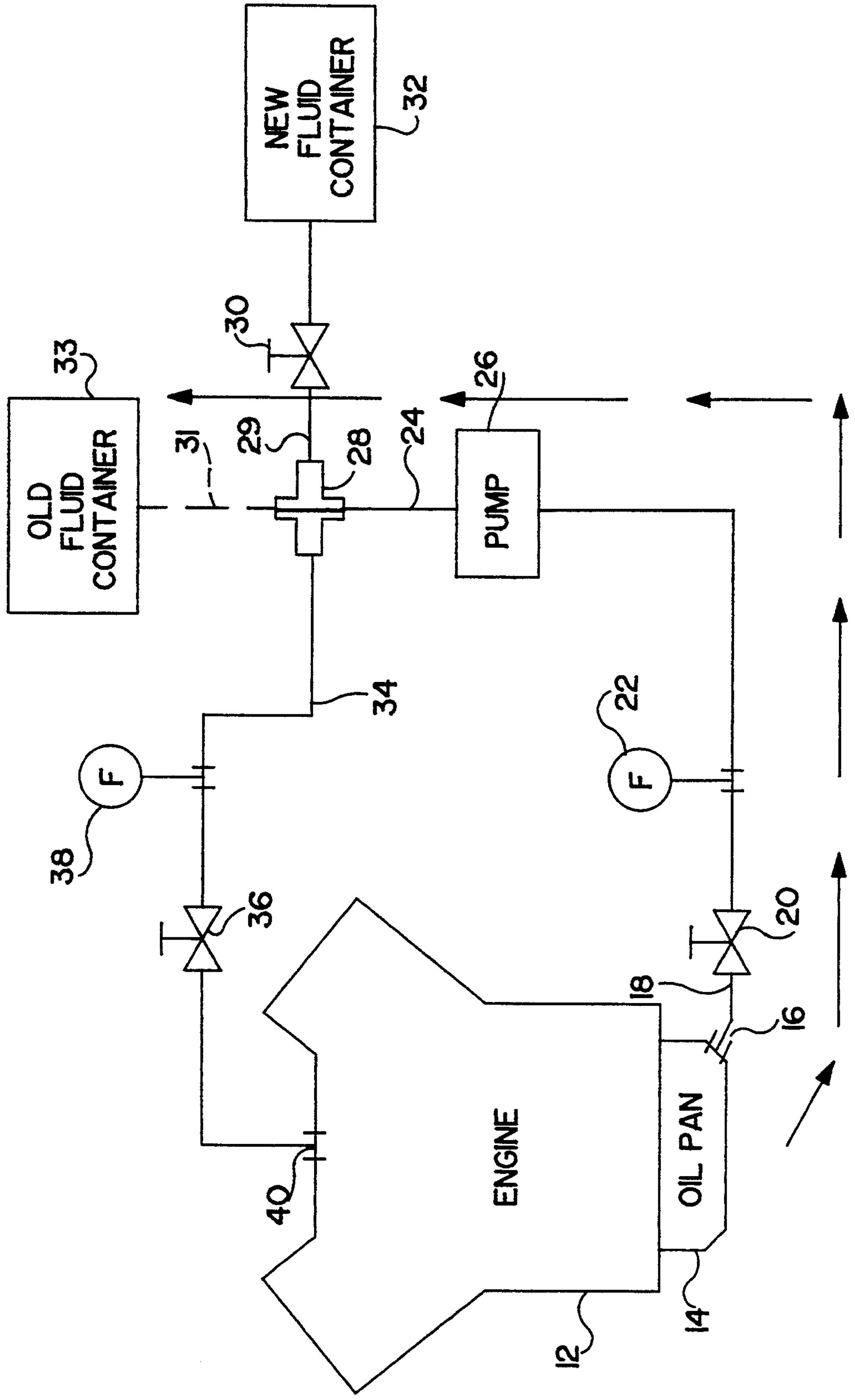
FIG. 2 shows the embodiment of FIG. 1 configured to pump fluid out of the engine.

FIG. 2 shows the present invention described with reference to FIG. 1 configured such that old fluid is pumped out of engine 12 and into old fluid container 33.

In the second configuration, pump 26 is controlled to pump fluid out of engine 12 via oil drain opening 16 and fluid line 18. Four-way valve 28 is set to create a fluid path which leads to a previously coupled old fluid container 33, via fluid line 31.

In this configuration, valve 20 is open, pump 26 is pumping out, four-way valve 28 is set to create a path to old oil container 33. If valves 30 and 36 are used, they are both closed.

FLUID IN OPERATION

Figure 3:
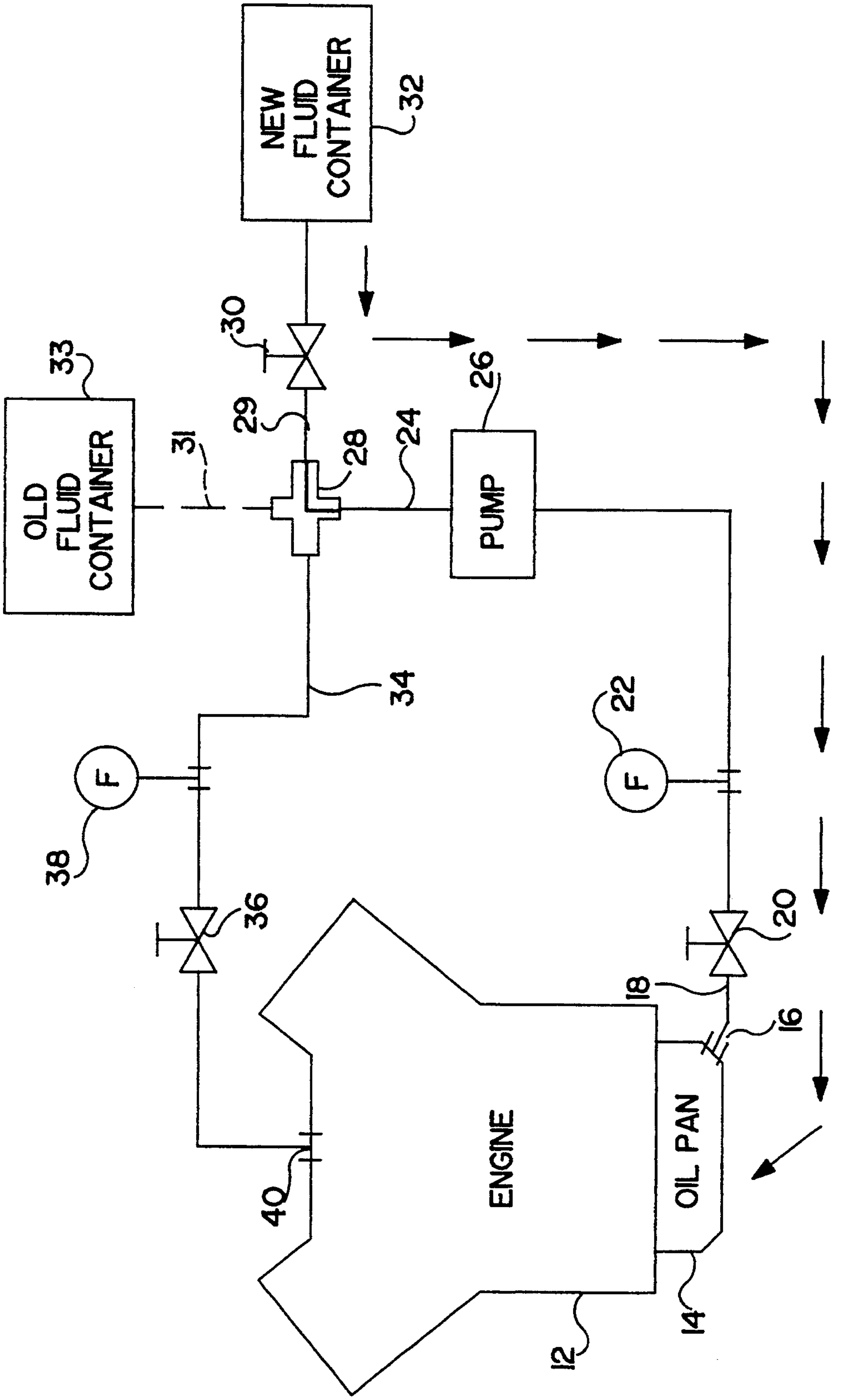
FIG. 3 shows the embodiment of FIG. 1 configured to pump fluid into the engine.

FIG. 3 shows the present invention described with reference to FIG. 1 configured such that new fluid is pumped into engine 12 from new fluid container 32.

In the third configuration, pump 26 is controlled to pump fluid into engine 12 via oil drain opening 16 and fluid line 18. Four-way valve 28 is configured to select a fluid path which leads from new fluid container 32, via fluid lines 29 and 28 to pump 26.

In this configuration, valve 20 is open, pump 26 is pumping in, four-way valve 28 is set to create a path from new fluid container 32 to pump 26. If valves 30 and 36 are used, valve 30 is open and valve 36 is closed.

It should be noted that when performing an operation in the third configuration, excess pressure may build and it is desirable, for safety and maintenance purposes, to provide a means for the excess pressure to escape. This could be accomplished with specially designed safety valves built in to an oil fill cap or by simply removing the oil fill cap or dipstick during a third configuration operation.

CIRCULATE OPERATION

Figure 4:
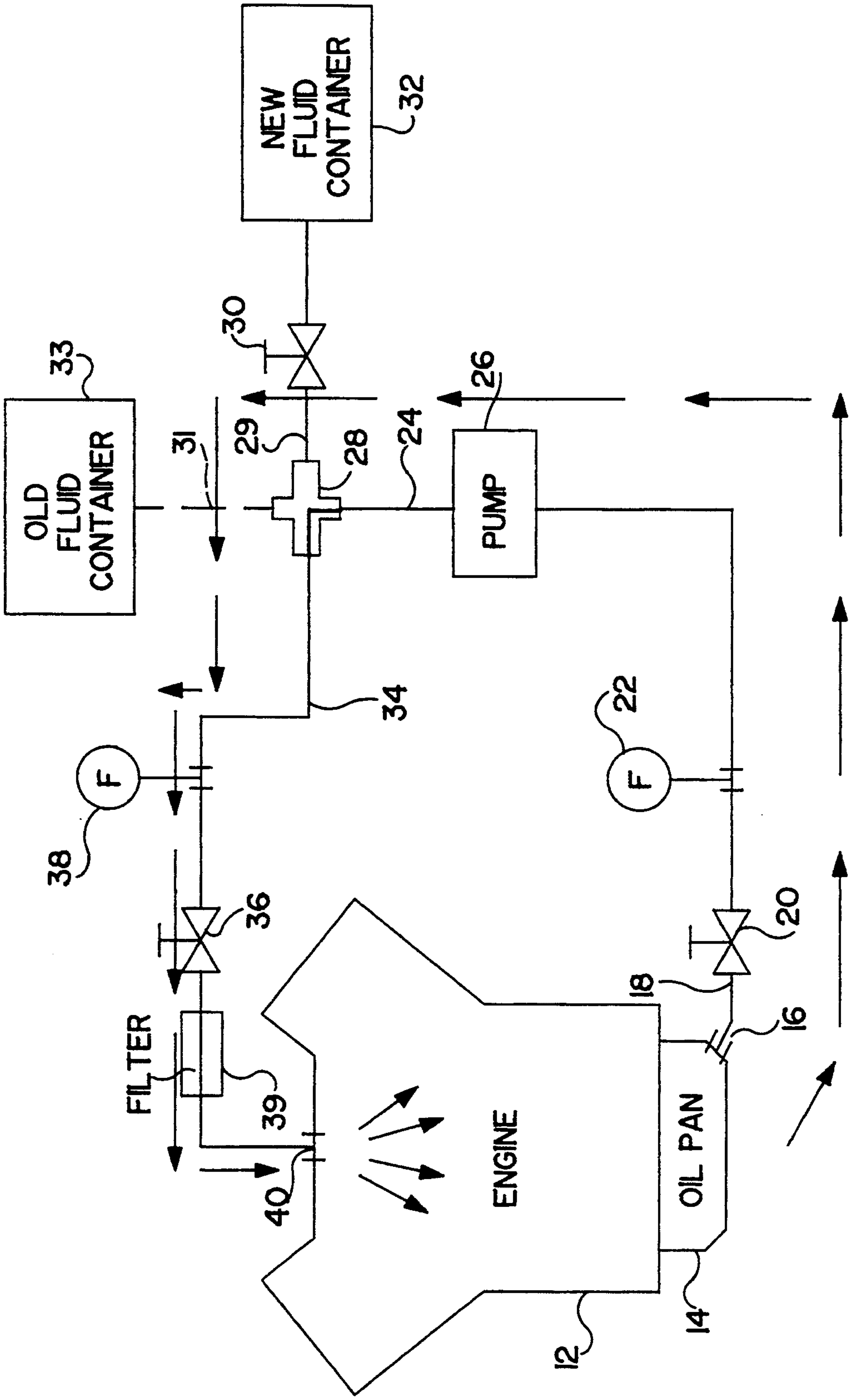
FIG. 4 shows the embodiment of FIG. 1 configured to circulate fluid throughout the engine.

FIG. 4 shows the present invention described with reference to FIG. 1 configured such that fluid existing in engine 12 and oil pan 14 is circulated throughout engine 12 by way of oil drain opening 16 and oil fill opening 40.

In the fourth configuration, as with the second configuration, pump 26 is controlled to pump fluid out of engine 12 via oil drain opening 16 and fluid line 18. However, four-way valve 28 is configured to select a fluid path which leads back to engine 12 through oil fill opening 40 via fluid line 34.

In this configuration, valve 20 is open, pump 26 is pumping out, four-way valve 28 is set to create a path from pump 26 to oil fill opening 40. If valves 30 and 36 are used, valve 30 is closed and valve 36 is open.

It should be noted that in this configuration it may be desirable to place a filter 39 in oil line 34 because, for example, in a pre-ignition lubrication operation oil is taken directly from oil pan 14 and pumped into engine 12.

Controller

It should be noted that, in the exemplary embodiment of the present invention, pump 26 and valves 20, 28, 30 and 36 are controlled manually or through individual switch controls. However, it is contemplated that control circuitry for setting up a desired configuration can be accomplished by implementing the following table using electronic logic circuitry.

TABLE I

| | OFF | OUT | IN | CIRCULATE |
|---|---|---|---|---|
| valve 20 | 0 | 1 | 1 | 1 |
| pump 26 | 0 | 1/O | 1/I | 1/O |
| 4-way | 0 | center | right | left |
| valve 30 | 0 | 0 | 1 | 0 |
| valve 36 | 0 | 0 | 0 | 1 |

It is understood that one of ordinary skill in the art could implement the above table in logic circuitry. Briefly, one implementation could include the ORing of the OUT, IN, and CIRCULATE signals to control valve 20. The same signal could control the on/off state of pump 26 while the IN signal could control its direction. The IN signal could also control valve 30 while the CIRCULATE signal could control valve 36. Finally, depending on the necessary inputs of a four-way valve, a logical combination of all four signals could be used to control multi-way valve 28. Additionally, because it may be desirable to include time periods defining how long a selected configuration would be allowed to operate (i.e., 30 seconds for pre-lubrication, 2 minutes for fluid out, etc.), it is also contemplated that the necessary controls could be implemented using a microprocessor.

Figure 5:
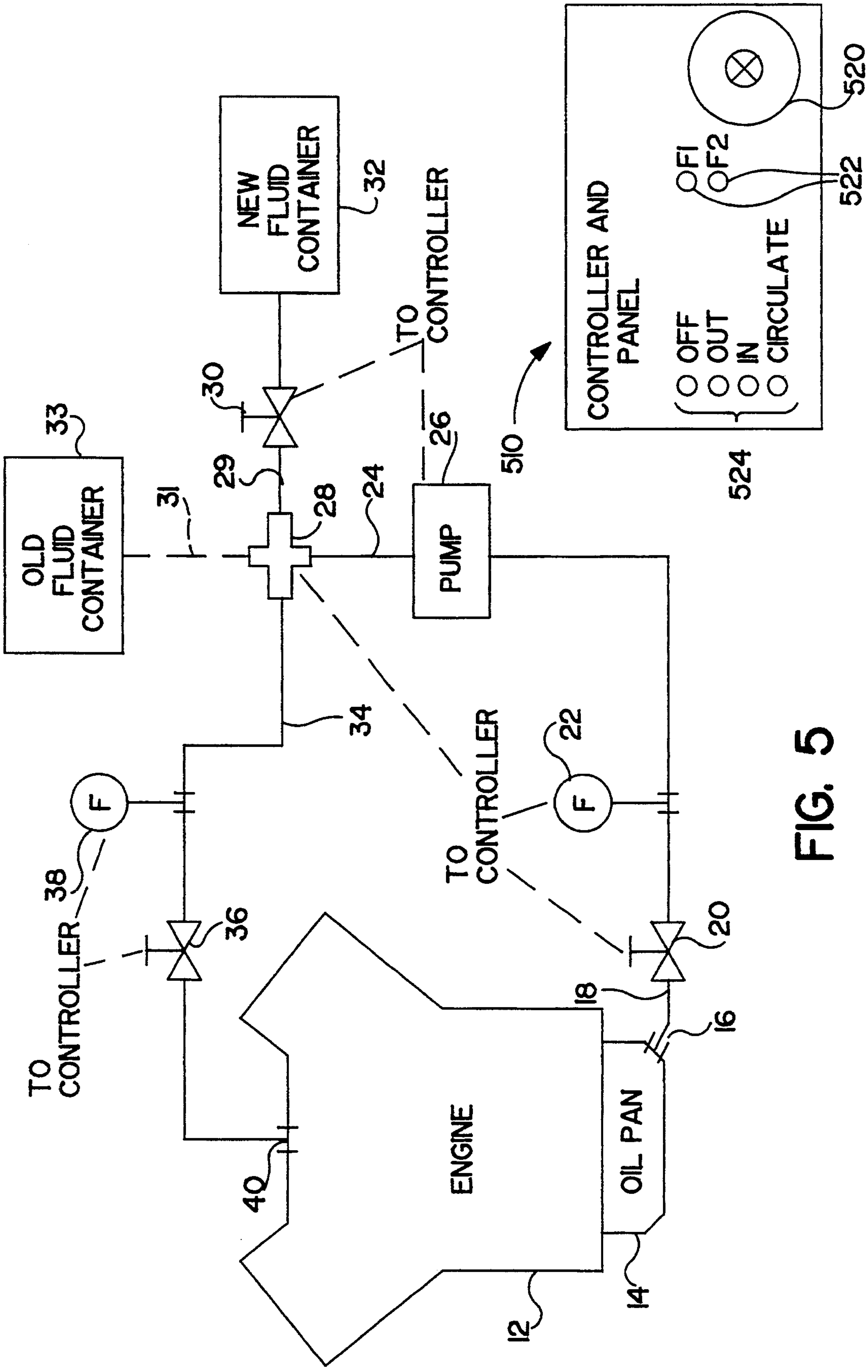
FIG. 5 shows the embodiment of FIG. 1 and its associated controller which controls the electronic components of the exemplary embodiment.

FIG. 5 shows a controller and panel 510 suitable for use with the present invention for the purpose of implementing the above-described logic to control the pump and/or electronic valves.

In FIG. 5, control panel 510 includes 1) a quick action coupling member 520 for attaching an external old fluid container, 2) LEDs 522 for indicating output from flow meters 22 and 38, and 3) four switches 524 for automatically configuring the valves and pump in one of the above-described four configurations.

Alternate Embodiment

Figure 6:
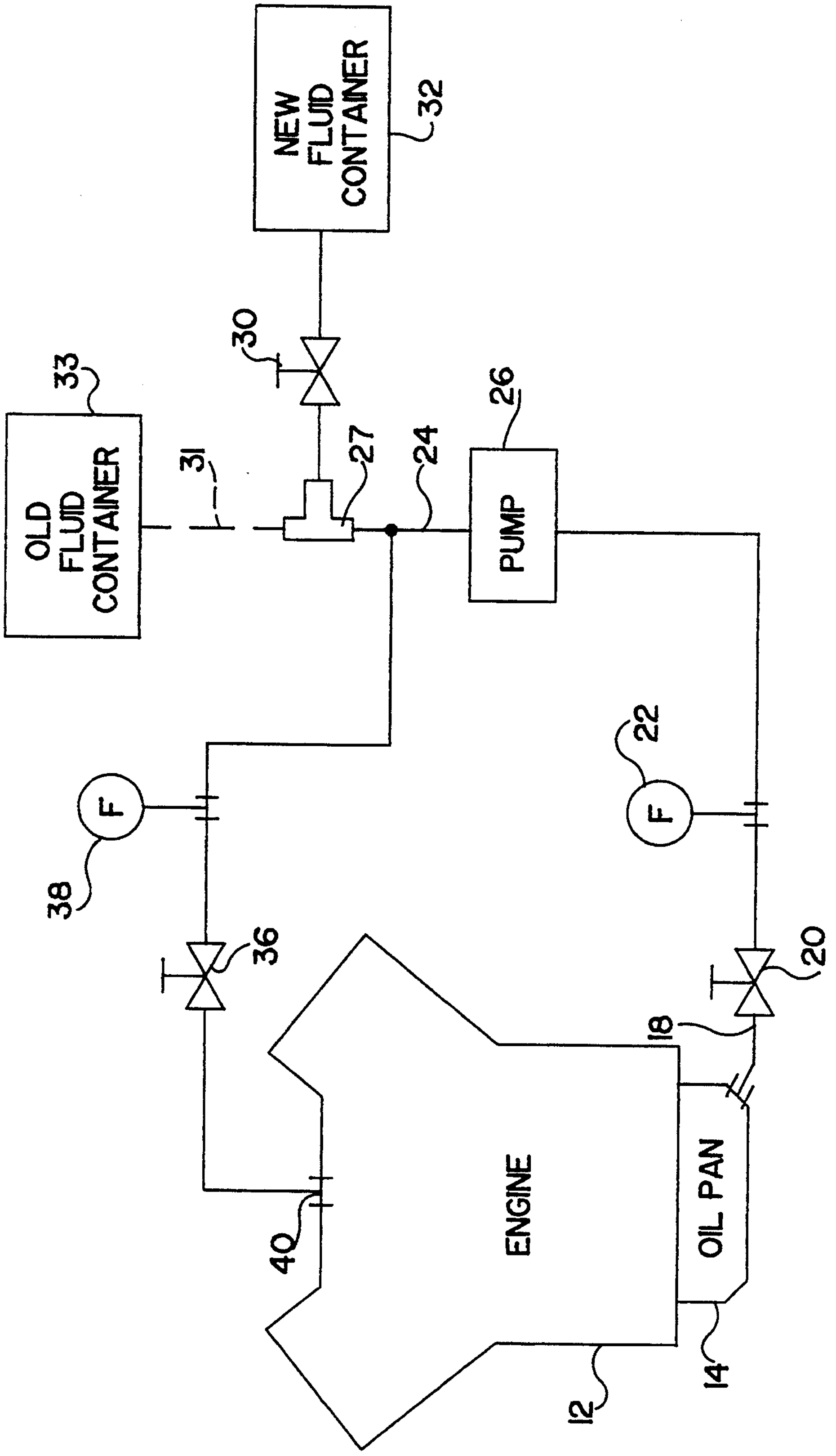
FIG. 6 shows an alternate embodiment of the present invention.

FIG. 6 shows an alternate embodiment of the present invention which, instead of using a four-way valve 28, a three way valve 27 is employed. Additionally, line 34 is coupled directly to line 24 such that valve 36 is used to control the flow of fluid from pump 26 to engine 12. The valve and pump controls for this alternate embodiment are substantially the same as for the operations of the exemplary embodiment.

In the exemplary embodiment of the present invention, the following is a list of parts suitable for use with the present invention. For reversible pump 26, a reversible pump manufactured by Bronze and distributed by Rangers in Bergenfield, N.J. For valves 20, 30 and 36, solenoid valves manufactured by Electro-Mite and distributed by Rangers in Bergenfield, N.J. The four-way valve 28 can be produced by one skilled in the art or by valve companies or machine shops. Flow meters 22 and 38 are also manufactured by Electro-Mite and distributed by Rangers in Bergenfield, N.J. If desired, off-the-shelf logic chips for implementing the control functions are available or a microprocessor could be suitably programmed and used.

It is understood that one of ordinary skill in the art could make the necessary connections from the fluid lines to oil drain opening 16 and to oil fill opening 40, however,examples of suitable connectors can be found in U.S. Pat. Nos. 5,044,334 (Bedi) and 5,074,380 (Bedi et al.), repectively, both of which are herein incorporated by reference.

It should be noted that, in the exemplary embodiment, the valves and flow meters are connected in their respective oil flow paths using quick action couplings.

Although the invention is illustrated and described herein embodied as a method and apparatus for performing high speed fluid changes in an internal combustion engine, the invention is nevertheless not intended to be limited to the details as shown. Rather, various modifications may be made in the details within the scope and range of equivalents of the claims and without departing from the spirit of the invention.

What is claimed:

1. A fluid change apparatus for an internal combustion engine of a land vehicle, the internal combustion engine having an oil pan with an associated drain opening and an oil fill opening, the apparatus comprising:

a first fluid conveying line coupled to the drain opening for providing fluid communication;

first valve means coupled to the first fluid line;

reversible pump means, coupled to the first valve means, for pumping fluid, the pump means having a first state of operation in which it pumps new fluid into the first line, a second state of operation in which it pumps existing fluid out of the first line, and a third state of operation in which it does not pump fluid;

a second fluid conveying line coupled to the pump means for providing fluid communication;

a new fluid container for holding new fluid:

a third fluid conveying line coupled to the new fluid container for providing fluid communication; and second valve means, coupled to the second and third lines, for selecting a flow path for fluid being pumped, the second valve means having a first state for coupling the second line to the third line and a second state for disposing of fluid being pumped through the second valve means, each of the fluid conveying lines, each of the valve means and the pump means all internally-mounted and fixedly secured to the land vehicle and proximate to the internal combustion engine.

2. The apparatus of claim 1, wherein the second valve means is a three-way valve.

3. The apparatus of claim 1 further comprising a fourth fluid conveying line for providing fluid communication, the fourth line being coupled between the second valve means and the oil fill opening of the engine, wherein the second valve means has a third state for coupling the second line to the fourth line to provide for one of circulation of cleansing fluid and pre-lubrication.

4. The apparatus of claim 3, wherein the second valve means is a four-way valve.

5. The apparatus of claim 3, further comprising a filter coupled to the fourth line.

6. The apparatus of claim 3, further comprising third valve means coupled to the third line and fourth valve means coupled to the fourth line.

7. The apparatus of claim 3, further comprising controller means, responsive to external input, for automatically configuring the first and second valve means, and the pump for one of 1) fluid out operation, 2) fluid in operation, 3) fluid circulate operation and 4) no operation.

8. The apparatus of claim 2 further comprising a fourth fluid conveying line for providing fluid communication, the fourth line being coupled between the second valve means and the oil fill opening of the engine, wherein the second valve means has a third state for coupling the second line to the fourth line to provide for one of circulation of cleansing fluid and pre-lubrication.

9. A fluid change apparatus for a single internal combustion engine of a land vehicle, the internal combustion engine having an oil pan with an associated drain opening and an oil fill opening, the apparatus comprising:

a first fluid conveying line coupled to the drain opening for providing fluid communication to draw fluid from and fill fluid into the internal combustion engine;

first valve means coupled to the first fluid line;

reversible pump means, coupled to the first valve means, for pumping fluid, the pump means having a first state of operation in which it pumps new fluid into the first line, a second state of operation in which it pumps existing fluid out of the first line, and a third state of operation in which it does not pump fluid;

a second fluid conveying line coupled to the pump means for providing fluid communication;

a new fluid container for holding new fluid;

a third fluid conveying line coupled to the new fluid container for providing fluid communication;

second valve means, coupled to the second and third lines, for selecting a flow path for fluid being pumped, the second valve means having a first state for coupling the second line to the third line to provide for filling the internal combustion engine with one of new fluid and cleansing fluid and a second state for disposing of, through a port in the second valve means, one of old fluid and cleansing fluid being pumped; and a fourth fluid conveying line for providing fluid communication, the fourth line being coupled between the second valve means and the oil fill opening of the engine, wherein the second valve means has a third state for coupling the second line to the fourth line to provide for one of circulation of cleansing fluid and pre-lubrication wherein fluid flows out of the drain opening through the first valve means, the pump means, the second fluid conveying line, the second valve means, the fourth fluid conveying line and into the fill opening, each of the fluid conveying lines, each of the valve means and the pump means all internally-mounted and fixedly secured to the land vehicle and proximate to the internal combustion engine.

* * * * *